United States Patent [19]
Heglund

[11] Patent Number: 5,936,386
[45] Date of Patent: Aug. 10, 1999

[54] METHOD OF LINEARIZING THE PERFORMANCE OF SWITCHED RELUCTANCE GENERATORS

[75] Inventor: William S. Heglund, Davis Junction, Ill.

[73] Assignee: Sundstrand Corporation, Rockford, Ill.

[21] Appl. No.: 08/926,511

[22] Filed: Sep. 10, 1997

[51] Int. Cl.⁶ .................................................. H02P 9/40
[52] U.S. Cl. ............................. 322/94; 322/20; 318/701
[58] Field of Search ................................ 322/19, 20, 27, 322/89, 94; 318/701

[56] References Cited

U.S. PATENT DOCUMENTS

| | | | |
|---|---|---|---|
| 3,560,820 | 2/1971 | Unnewehr | 318/138 |
| 4,143,308 | 3/1979 | Deplante et al. | 318/138 |
| 4,230,976 | 10/1980 | Muller | 318/138 |
| 4,896,088 | 1/1990 | Jahns | 318/696 |
| 5,166,591 | 11/1992 | Stephens et al. | 318/701 |
| 5,204,604 | 4/1993 | Radun | 318/701 |
| 5,289,107 | 2/1994 | Radun et al. | 322/94 |
| 5,327,069 | 7/1994 | Radun et al. | 322/10 |
| 5,381,081 | 1/1995 | Radun | 322/94 |
| 5,404,091 | 4/1995 | Radun | 322/94 |
| 5,530,333 | 6/1996 | Turner | 318/701 |
| 5,545,964 | 8/1996 | Stephenson et al. | 318/701 |
| 5,705,918 | 1/1998 | Davis | 322/94 |
| 5,726,560 | 3/1998 | Eakman et al. | 322/89 |
| 5,780,997 | 7/1998 | Sutrina et al. | 322/29 |
| 5,850,133 | 12/1998 | Heglund | 318/700 |

*Primary Examiner*—Nestor Ramirez
*Assistant Examiner*—Nicholas Ponomarenko
*Attorney, Agent, or Firm*—Jeffrey J. Makeever

[57] ABSTRACT

A method of linearizing the output performance of a switched reluctance generator, comprises the steps of exciting the switched reluctance generator during a first phase of operation at a turn-on angle which need not be accurately calculated to produce the desired excitation current. Next, during a second phase of commutation, the switched reluctance generator is freewheeled when a phase current of the switched reluctance generator exceeds a first calculated current level. This freewheeling continues until the phase current of the switched reluctance generator exceeds a second calculated current level, at which point the switched reluctance generator enters the generation phase of its commutation cycle. The linearization of the performance occurs because the first and second calculated current levels are calculated as a function of energy converted per electrical cycle. This function of energy converted per electrical cycle is calculated using an inductance of the switched reluctance generator in an aligned position and an inductance of the switched reluctance generator in an unaligned position. The shape of a graph of the flux linkage versus the phase current is controlled through the selection of the first and second calculated current levels which increases efficiency while linearizing the performance of the switched reluctance generator. The area enclosed by this graph is equal to the energy converted per electrical cycle.

10 Claims, 11 Drawing Sheets

US005936386A

METHOD OF LINEARIZING THE PERFORMANCE OF SWITCHED RELUCTANCE GENERATORS

FIELD OF THE INVENTION

This present invention relates generally to commutation methods for switched reluctance generators, and more particularly to a generation commutation method for a switched reluctance generator which allows for the linearization of the switched reluctance generator's output without the need to accurately calculate turn-on angle and which operates over wide machine parameter tolerances.

BACKGROUND ART

The continued advances in high power switching semiconductors and control electronics have enabled switched reluctance machines, which have been used extensively in motor applications with great success in the past, to be exploited increasingly for the generation of electric power. Such use is highly desirable in light of the simple and rugged winding-free, magnet-free, brushless construction of the salient pole rotor. This rugged construction allows the machine to be run at high speeds and in very harsh environmental conditions. Additionally, since the rotor does not have windings or magnets, its cost is less than a wound or permanent magnet rotor.

A typical commutation approach which is used to allow this generation of electric power with a switched reluctance machine is illustrated by the simplified schematics of FIGS. 1a and 1b viewed in conjunction with the graphs of FIG. 2. As the rotor rotates, the inductance of the stator winding varies as the salient rotor poles come in and out of alignment with the stator poles, as illustrated by trace 20 of FIG. 2. To allow electric power generation, the switches 22, 24 (typically electronic semiconductor devices) are closed to allow current to flow from the bus 26 to energize the stator winding 28 as indicated by arrows 30, 32. This turn-on occurs at a turn-on angle after alignment of the rotor and stator pole has begun, as indicated as axis 34 on FIG. 2 (indicated as TURN_ON). Once both switches 22, 24 are closed, the current through the stator winding 28 increases as indicated by trace 36 on FIG. 2. At axis 38, the rotor pole and the stator pole are aligned and the inductance peaks. After this point the inductance begins to decrease, which results in a rapidly increasing current. Once this increasing current exceeds the upper current limit ($I_{HI}$) at axis 44, both switches 22, 24 are opened (see FIG. 1b) and the current is returned to the bus 26 through diodes 40, 42. Due to the decreasing inductance during this phase, the current delivered to the bus continues to increase. Once, however, the rotor and stator pole are unaligned beginning at axis 46, the inductance has reached its minimum value (at which it remains until the rotor and stator poles begin to come into alignment again). During this period, the current delivered to the bus decays until it reaches zero. Because more current is generated during the decrease in inductance as the rotor pole pulls away from the stator pole than is required to be supplied by the bus, a net generation of electric power occurs.

The voltage response of such an electric power system including a switched reluctance generator is dominated by the characteristics of the voltage loop control. This is a result of the differences between a synchronous generator, which is typically used, and a switched reluctance generator. This difference arises because a synchronous generator is essentially a voltage source with an internal reactance that causes the output voltage to decrease as the load increases. With no changes in the excitation current, an electrical system with a synchronous generator will maintain a relatively constant voltage for a wide range of loads. A switched reluctance generator, on the contrary, is essentially a controlled current source that requires continued controller action to produce the desired voltage. With no changes in the commands to the inverter of a switched reluctance generator, the bus voltage either increases significantly or decreases to zero with only moderate changes in load. This is a significant problem which heretofore has impeded the utilization of the switched reluctance machine in regulated voltage power generation systems.

In order for a switched reluctance generator to provide regulated voltage it is necessary to close a voltage control loop. The conventional approach for obtaining a high bandwidth voltage control loop is to develop a linear relationship between the command DC link current and the actual DC link current. This linear relationship is developed, in prior systems, by repeatedly running an analysis program and obtaining a map of the control variables, operating point, and DC link current. For a switched reluctance generator, the control variables are the turn-on angle, turn-off angle, and the commanded currents, and the operating conditions are generator speed and bus voltage. Once a map of control variables versus desired DC link current is determined for a particular machine, it is implemented in the controller and utilized to control the generator operation. Since this approach relies on a map of the machine performance characteristics (analytical or measured) of a particular machine or small group of machines, differences between analytical and actual characteristics and variations between specific generators can have a significant impact on the performance of any particular generator. One such parameter which varies from one machine to the next and which has been shown to cause significant differences in the switched reluctance generator performance characteristics is the airgap thickness. Since it is difficult and burdensome to maintain a specific controller with a specific machine to overcome this problem, the mapping approach does not provide the robust linearization necessary for high performance electric power systems.

The instant invention is directed at overcoming one or more of the above identified problems existing with the prior art.

SUMMARY OF THE INVENTION

It is a principle objective of the instant invention to provide a new and improved commutation approach for a switched reluctance generator. More specifically, it is a principle objective of the instant invention to provide a commutation approach for a switched reluctance generator which will linearize the output performance of the generator over wide speed and machine tolerance variations.

In an exemplary embodiment of the invention, the method of linearizing the output performance of a switched reluctance generator comprises the steps of exciting the switched reluctance generator during a first phase of operation at a turn-on angle which need not be accurately calculated to produce the desired excitation current. Next, during a second phase of commutation, the switched reluctance generator is freewheeled when a phase current of the switched reluctance generator exceeds a first calculated current level. This freewheeling continues until the phase current of the switched reluctance generator exceeds a second calculated current level, at which point the switched reluctance generator enters the generation phase of its commutation cycle. If, during heavy bus loading, the phase current does not reach the second calculated current level, the generator will enter the generation phase after a turn-off angle is reached. The linearization of the performance occurs because the first and second calculated current levels are calculated as a function of energy converted per electrical cycle. This function of energy converted per electrical cycle is calculated using an inductance of the switched reluctance generator in an aligned position and an inductance of the switched reluctance generator in an unaligned position. The shape of a graph of the flux linkage versus the phase current is controlled through the selection of the first and second calculated current levels which increases efficiency while linearizing the performance of the switched reluctance generator. The area enclosed by this graph is equal to the energy converted per electrical cycle.

In a further embodiment of the instant invention, the switched reluctance generator is excited with phase current which follows a flux linkage versus current curve having a slope approximately equal to an aligned inductance of the switched reluctance generator. The generator is then allowed to freewheel with increasing phase current while the flux linkage is maintained relatively constant. The switched reluctance generator then enters a generation mode which is characterized by relatively constant phase current with drooping flux linkage. Once the flux linkage has drooped to a predetermined value determined by a flux linkage versus current curve governed by an unaligned inductance of the switched reluctance generator, the phase current of the switched reluctance generator decreases along a flux linkage versus current curve having a slope approximately equal to an unaligned inductance of the switched reluctance generator.

In a further embodiment of the instant invention, the bus voltage, speed of the switched reluctance generator, and the number of electrical cycles per revolution of the switched reluctance generator are monitored, and the bus voltage is compared with a predetermined voltage command, generating a voltage error signal. A dc current command signal is then calculated from the voltage error signal, and the energy per cycle of the switched reluctance generator is calculated. Once this energy per cycle has been calculated, a first calculated current level and a second calculated current level are calculated. The switched reluctance generator is then excited until a phase current exceeds the first calculated current level, at which point the generator is allowed to freewheel. This phase continues until the phase current exceeds the second calculated current level, and thereafter the switched reluctance generator is allowed to enter the generating phase of commutation.

Other objectives and advantages will become apparent from the following specification taken in conjunction with the accompanying drawings.

BRIEF DESCRIPTION OF THE DRAWINGS

While the specification concludes with claims particularly pointing out and distinctly claiming that which is regarded as the present invention, the organization, the advantages, and further objects of the invention may be readily ascertained by one skilled in the art from the following detailed description when read in conjunction with the accompanying drawings in which:

DESCRIPTION OF THE PREFERRED EMBODIMENTS

Figure 1A:
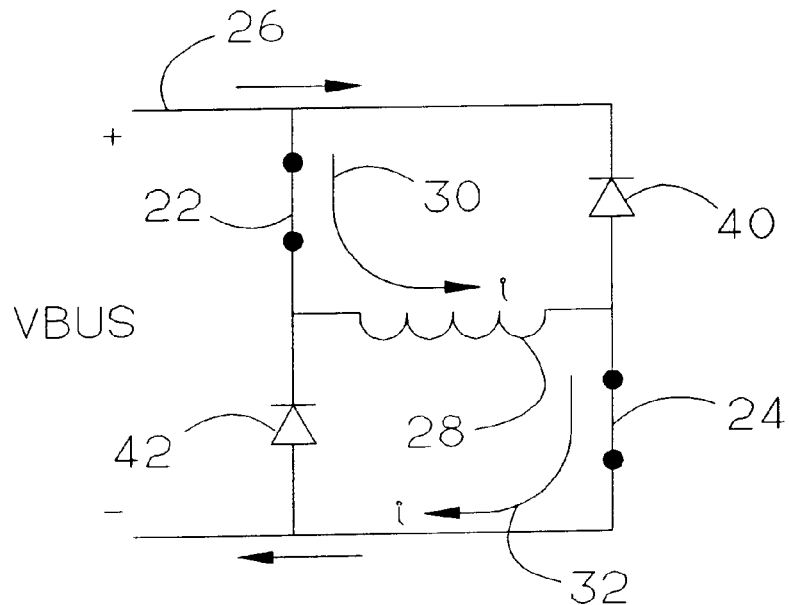
FIGS. 1a–b are simplified schematic diagrams illustrating stages of switched reluctance commutation.
Figure 1B:
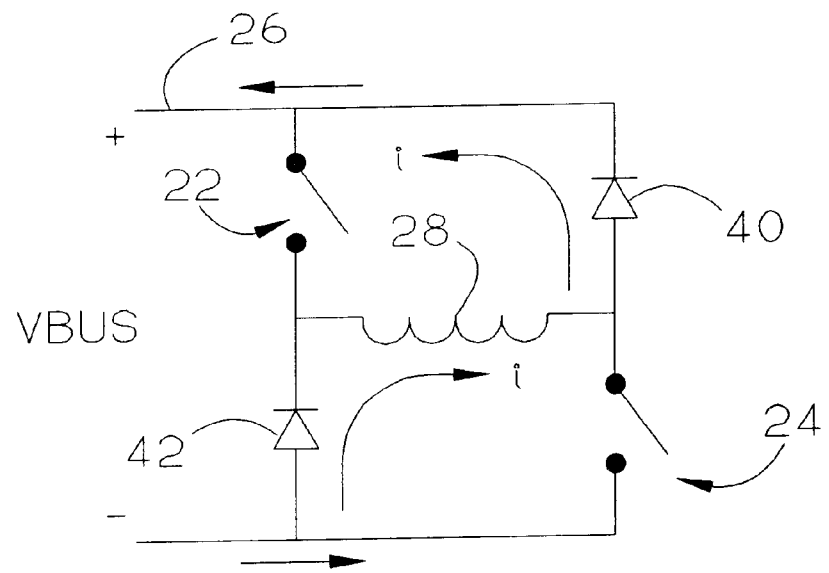
Figure 2:
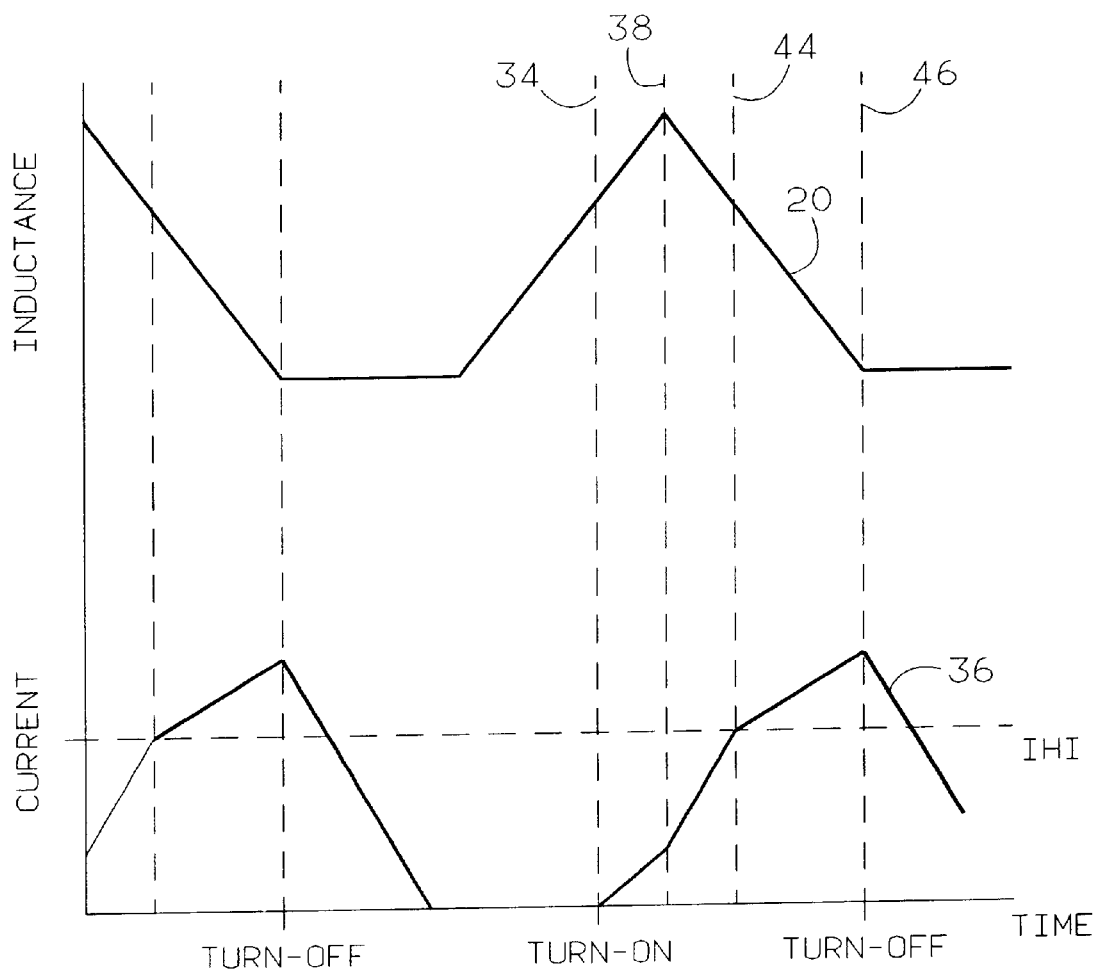
FIG. 2 is a graphical illustration of the stator winding inductance and current versus time during a prior art generate mode commutation approach.
Figure 3:
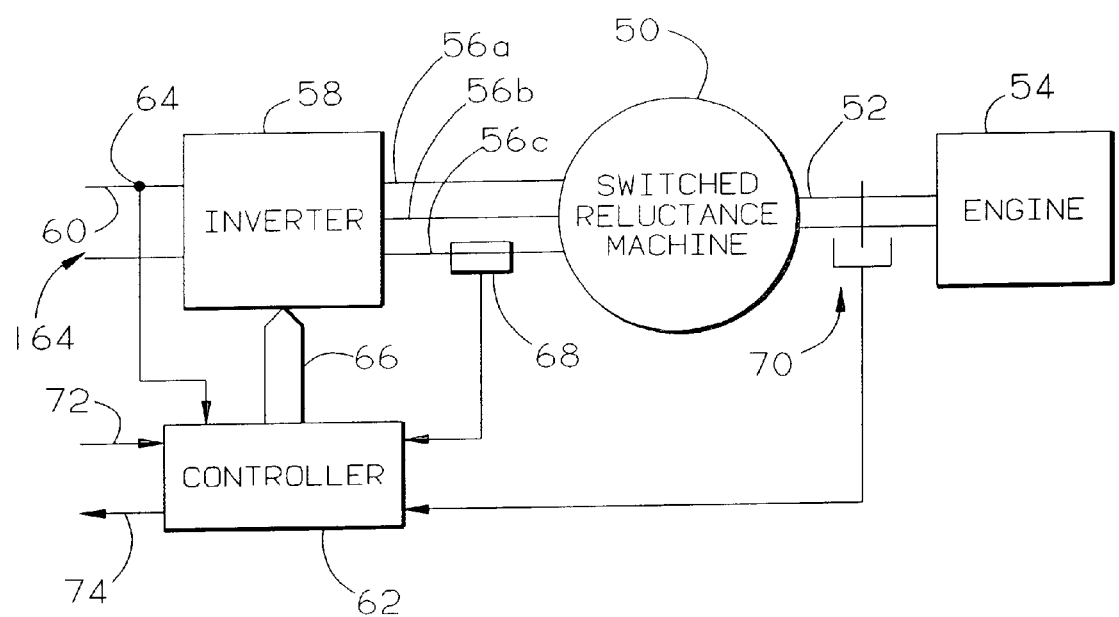
FIG. 3 is a system level block diagram to which the instant invention is particularly applicable.

An embodiment of the electric power generating system suitable for implementation of commutation method of the instant invention, as illustrated in FIG. 3, comprises a switched reluctance machine 50 having a rotor (not shown) drivably coupled by shaft means 52 to a turbine engine 54. The shaft means 52 may preferably provide direct coupling to the engine 54, or may provide coupling through appropriate gearing or differentials as desired. Additionally, the shaft means 52 may be integral to the engine and the switched reluctance machine 50 provided integrally therein. The machine 50 is electrically coupled by a plurality of phase leads 56a, 56b, 56c to an inverter 58, which is electrically coupled by a dc input/output 164 to a dc distribution bus 60. A controller 62 monitors this dc distribution bus 60 at a point of regulation 64, and provides control signals 66 to the inverter 58. Current sensing means 68 are used to monitor current flow in the phase leads 56a, 56b, 56c, and rotor position resolving means 70 are used to monitor rotor position and speed. As will be recognized by one skilled in the art, resolution of the rotor position and speed may be by electronic means as well as through a resolver. External system communications, including control inputs 72 and status outputs 74, are also provided through the controller.

This system is preferably a high voltage dc system, although the concepts described herein have equal applicability to a dc link variable speed constant frequency (VSCF) system. Preferably, the electric power generating system described herein is a 270 volt dc system with power quality as defined by applicable industry standards, such as MIL-STD-704E and others. The control for this system allows bi-directional electric power flow to maintain this power quality in the presence of both net dissapative and net regenerative loads.

Figure 4:
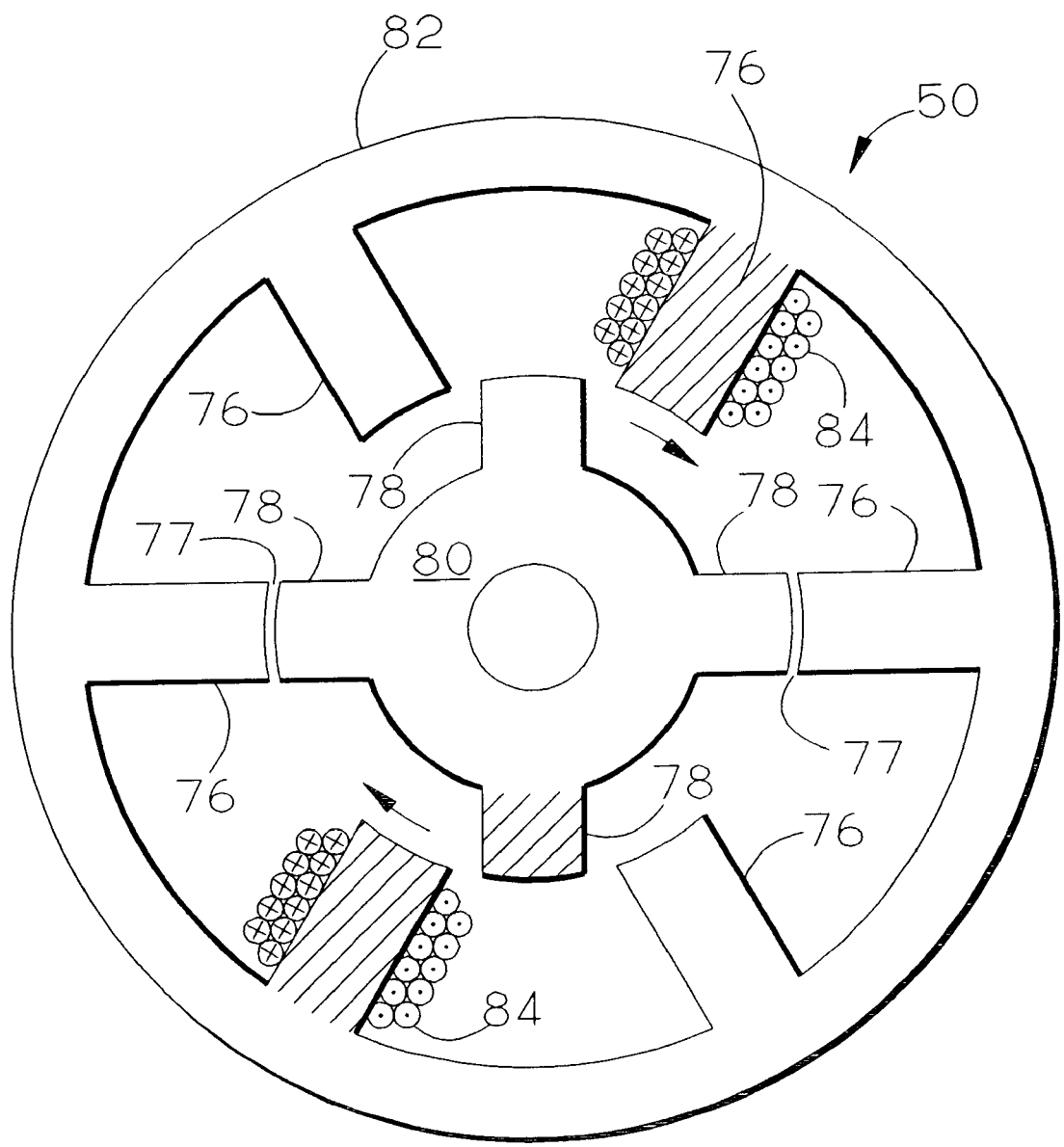
FIG. 4 is a diagrammatic cross section of a switched reluctance machine applicable to the instant invention.

The switched reluctance machine topology, as illustrated by the cross section of FIG. 4, utilizes a first plurality of salient stator poles 76 and a second plurality of salient rotor poles 78. Advantageously, a 6/4 topology having six stator poles 76 and four rotor poles 78 is used. As is recognized by one skilled in the art, a different topology could be utilized with corresponding changes in the inverter 58 and the controller 62 without departing from the scope of the invention. To allow rotation of the rotor 80, a small air gap 77 exists between the outer periphery of the rotor poles 78 and the inner periphery of the stator poles 76. This air gap is typically small, often in the range of 0.03 inch, but it may vary due to machining and manufacturing tolerances. Since a switched reluctance machine operates as it does due to the varying inductance between the rotor and stator poles, even a slight change in the air gap separation of these two poles will have a significant impact on the performance characteristics of the switched reluctance machine.

Figure 5:
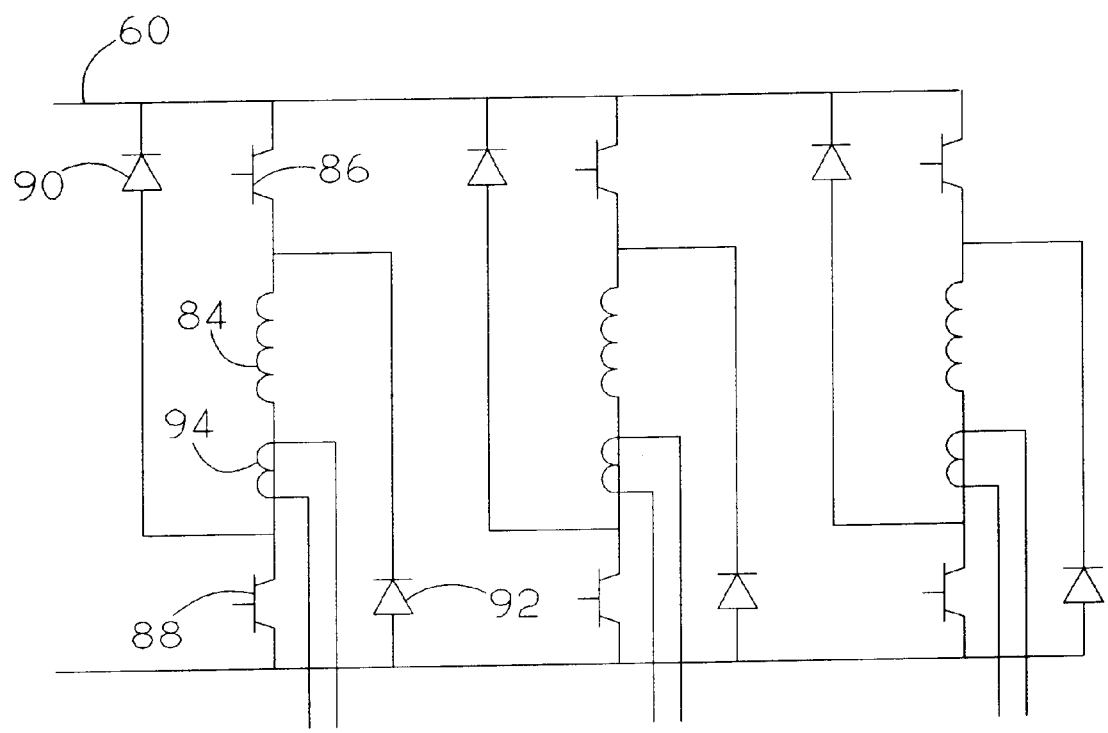
FIG. 5 is a single line electrical schematic diagram of an embodiment of the instant invention.

Referring back to FIG. 3, the inverter 58 is also capable of receiving power from the dc distribution bus 60 to perform engine starting as is known in the art, in addition to providing voltage regulation on the dc distribution bus 60 during generation mode, thus realizing a greater system weight savings through further integration. A three phase inverter topology (bridge topology) suitable for use with the commutation method of the instant invention, as illustrated in FIG. 5, comprises switching means, such as the two switches 86, 88, and commutation means, such as the two diodes 90, 92, for each stator pole phase winding 84. Each phase of the inverter 58 is identical, and, therefore, only one phase will be described in detail herein. The switched reluctance machine phase winding 84 is in series with both switches 86, 88. As the switches 86, 88 are gated into conduction or enabled, current flows from the dc distribution bus 60 to energize the winding 84. This current is monitored by current sensing means, such as current sensors 94, having a bandwidth extending from dc to greater than 50 kHz, which is included in each phase to provide feedback of the instantaneous phase current to the controller 62 (FIG. 3). When the switches 86, 88 are gated out of conduction or disabled, the current is forced to communicate through the cross-coupled diodes 90 and 92 because the direction and magnitude of current flow through the winding 84 cannot change instantaneously. Preferably, the switches 86, 88 are insulated gate bipolar transistors (IGBTs), although other power switching devices such as MOS-controlled thyristors (MCT), static induction transistors (SITs), et cetera, may be use as appropriate. As will be recognized by one skilled in the art, other topologies as appropriate may also be operated in accordance with the commutation method of the instant invention.

Figure 6A:
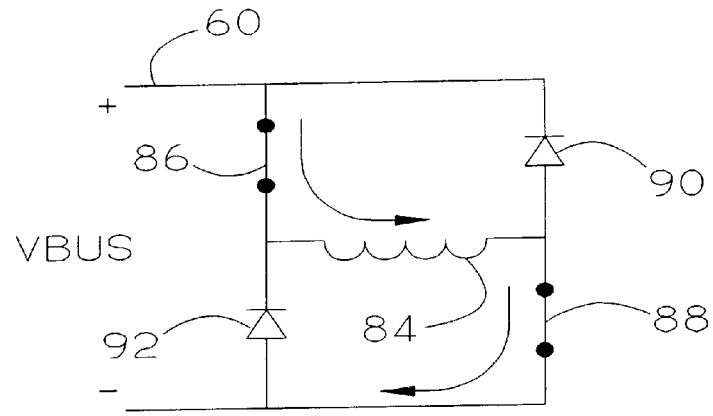
FIGS. 6a–c are simplified schematic diagrams illustrating stages of switched reluctance commutation utilized in an embodiment of the instant invention.
Figure 6B:
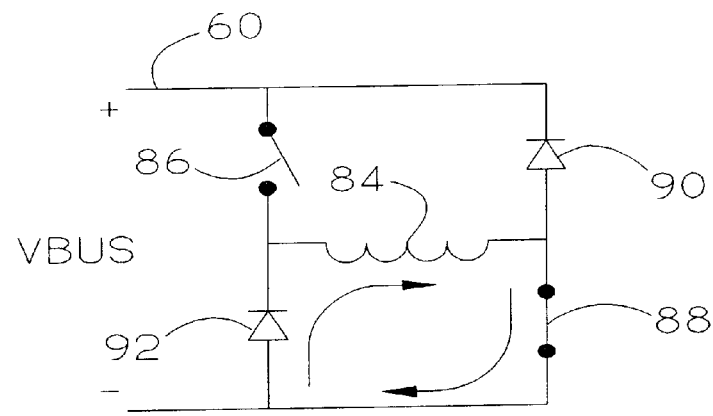
Figure 6C:
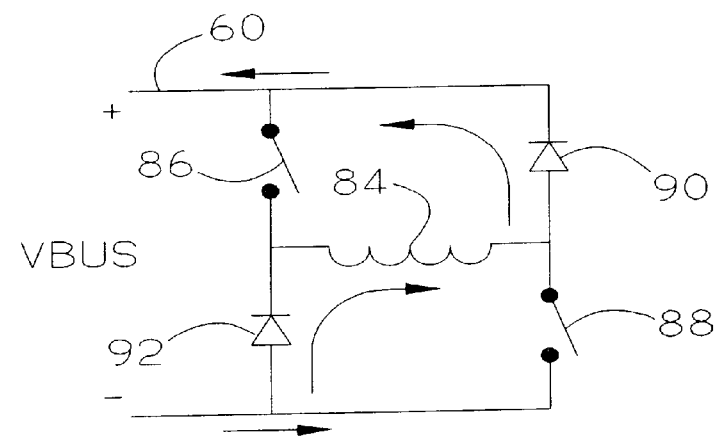
Figure 7:
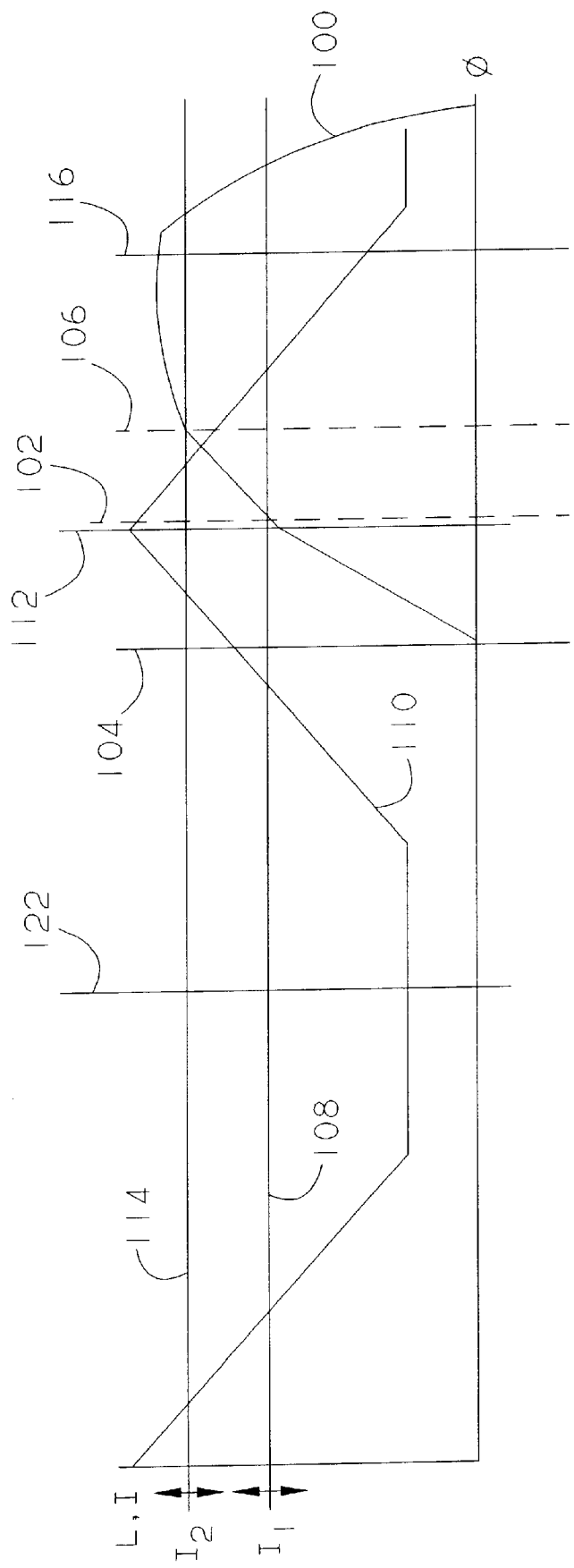
FIG. 7 is a graphical illustration of a switched reluctance generator's output current profile when being commutated by an embodiment of the instant invention.
Figure 8:
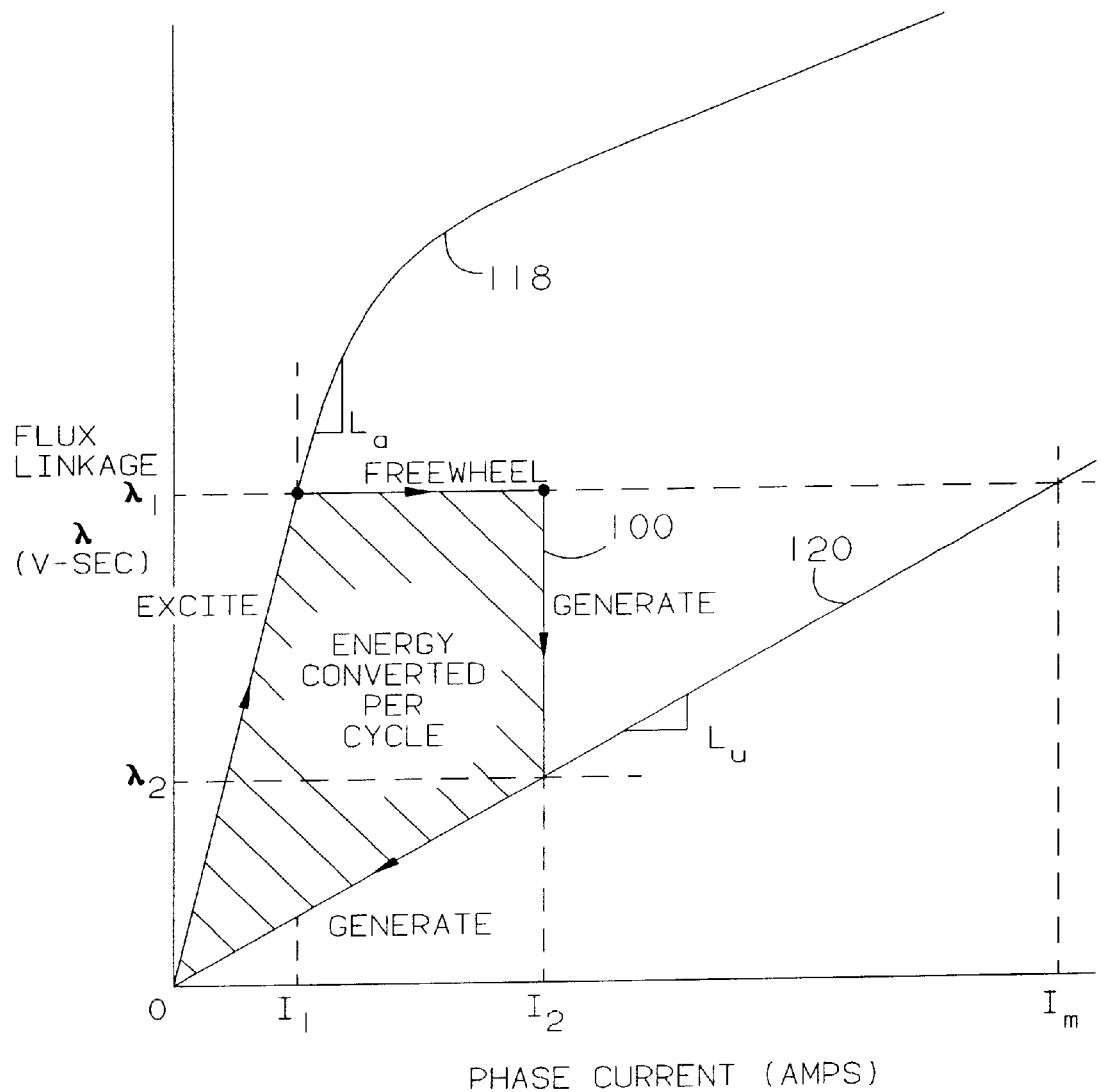
FIG. 8 is a graphical illustration of an electrical cycle shown on a flux linkage versus phase current representation.

The three switch configurations utilized during each phase of the preferred commutation method of the instant invention are illustrated in FIGS. 6a, 6b, and 6c, and will be referred to during the discussion of FIGS. 7 and 8. The first switch configuration is illustrated in FIG. 6a and will be referred to as the excite configuration. During this excite configuration both switches 86, 88 are closed and current is allowed to flow from the bus 60 through the stator winding 84 as indicated by the current flow arrows. The second switch configuration is illustrated in FIG. 6b and will be referred to as the freewheeling configuration. During this freewheeling configuration one of the switches, 86 or 88, is closed while the other one is opened, 88 or 86. The current through the winding 84 is allowed to continue to flow through the closed switch (86 or 88) and one of the diodes (92 or 90). While FIG. 6b illustrates switch 88 being closed and switch 86 being opened, one skilled in the art will recognize that this situation may be reversed without degradation of performance or departure from the invention. The third switch configuration is illustrated in FIG. 6c and will be referred to as the generate configuration. During this generate configuration both switches 86 and 88 are opened and the current through winding 84 flows through diodes 92 and 90 back to bus 60 as indicated by the current flow arrows.

With the commutation approach of the instant invention, it is possible to obtain the commanded current as the poles of the switched reluctance generator are near alignment. Utilizing an embodiment of the instant invention, therefore, it is no longer necessary to accurately calculate the turn-on angle which will produce the desired excitation current (I1) when the poles are near alignment as was required by the prior commutation methods discussed above. With the commutation approach of the instant invention, simply a sufficiently advanced turn-on angle is selected and the excitation current is controlled, if necessary, by alternating between excite (FIG. 6a) and freewheel (FIG. 6b) until the poles are near alignment. Reasonable selection of the turn-on angle is necessary to reduce time that current is freewheeling in the phase during the excitation portion of the electrical cycle so that copper losses are kept to a minimum.

In a preferred embodiment of the commutation method of the instant invention, the phase current 100 is allowed to increase without any additional excitation through the introduction of the freewheel state (FIG. 6b) at axis 102 between the excite state (FIG. 6a) from axis 104 and the generate state (FIG. 6c) beginning at axis 106 as the inductance 110 is decreasing as illustrated by FIG. 7. This commutation approach begins each cycle by entering the excite switch configuration (FIG. 6a) at a rotor turn-on angle sufficiently advanced at axis 104. During this initial excite phase, the phase current 100 begins to increase, and when the phase current 100 exceeds a lower current threshold (I1) 108, one of the switches is commanded open and the current freewheels (FIG. 6b). Since the inductance 110 is decreasing after alignment (axis 112) the phase current 100 continues to increase without further excitation current being required from the bus. Allowing the current to increase by freewheeling (FIG. 6b) allows the machine to achieve high phase currents (desirable for producing large DC link currents) while operating at low flux levels. Since hysteresis and eddy current losses are a function of the flux level, the commutation approach of the instant invention may significantly decrease the hysteresis and eddy current losses which will result in a much increased efficiency. When the phase current 100 exceeds the upper current threshold (I2) 114, both of the switches are commanded to open (FIG. 6c) and power is delivered to the DC bus. If, during heavy bus loading, the phase current does not reach the upper current threshold (I2) 114 before the maximum turn-off angle (axis 116) is reached, both of the switches are commanded to open (FIG. 6c) and power is delivered to the DC bus at that point.

For a switched reluctance machine the average power converted each cycle is the area enclosed by the curve illustrated by FIG. 8 of the flux linkage versus phase current. As this figure illustrates, during the initial excite phase (see FIG. 6a and FIG. 7) the phase current 100 follows a curve 118 determined by the aligned position of the poles. During this phase the slope of this cure 118 is the aligned inductance ($L_a$) of the machine. Once the phase current 100 reaches the lower current threshold (I1), one of the switches is allowed to open to enter the freewheel state (see FIG. 6b and FIG. 7). During this phase of the cycle, the phase current 100 continues to increase while the flux linkage remains constant at λ1. Once the phase current reaches the upper current limit (I2), both switches are opened to enter the generate state (see FIG. 6c and FIG. 7). During this phase of the cycle, the phase current 100 remains relatively constant while the flux linkage droops. This relationship continues until the flux linkage reaches a point λ2 which corresponds to the point of intersection with a curve 120 determined by the unaligned position of the poles. The phase current 100 follows this curve 120, the slope of which is the unaligned inductance ($L_u$), until the phase current 100 and flux linkage both return to zero. As may be seen from FIG. 8, the introduction of the freewheeling state from I1 to I2 significantly increases the area enclosed by the curve 100 and, therefore, the average energy converted per electrical cycle.

Using a commutation approach in accordance with the instant invention, the shape of the curve 100 is controlled through the excitation (0 to I1) and freewheel (I1 to I2) portion of the electrical cycle. During the generate portion of the cycle, the shape of the curve is a function of the machine flux linkage characteristics and the machine speed. For simplicity, it is assumed that the current 100 remains constant as the poles approach the unaligned position (see FIG. 7, axis 122) and that the current follows the unaligned curve from I2 to 0. With the commanded excitation current (I1) established when the poles are aligned, the current freewheeling from I1 to I2, and assuming a current decay profile, it is possible to calculate the energy converted per electrical cycle. The average power produced by the machine can be calculated from the energy per electrical cycle, the number of electrical cycles per revolution (machine parameter), and the number of revolutions per second (speed). Once the average power produced by the machine has been calculated, the average current can be calculated by dividing by the bus voltage. It is also possible to calculate the actual shape of the curve in the generate portion of the cycle (I2 to 0) to further increase the accuracy of this power calculation. With reference to FIG. 8, if we let:

$$I2 = I1 + (Im - I1) \times 0 \leq x \leq 1 \tag{1}$$

$$\lambda_1 = L_a I1 \tag{2}$$

$$\lambda_2 = L_u I2 \tag{3}$$

$$\lambda_1 = L_u I_m \tag{4}$$

where: La=aligned inductance, and Lu=unaligned inductance. Now, to calculated the area A enclosed by the curve:

$$A \approx \lambda_1 I2 - \frac{1}{2}\lambda_1 I1 - \frac{1}{2}\lambda_2 I2 \tag{5}$$

$$A \approx L_a I1 I2 - \frac{1}{2} L_a I1^2 - \frac{1}{2} L_u I2^2 \tag{6}$$

$$A \approx L_a I1 [I1 + (I_m - I1)x] - \frac{1}{2} L_a I1^2 - \frac{1}{2} L_u [I1 + (I_m - I1)x]^2 \tag{7}$$

$$A \approx L_a I1^2 \left[1 + \left(\frac{L_a}{L_u} - 1\right)x\right] - \frac{1}{2} L_a I1^2 - \frac{1}{2} L_u \left[1 + \left(\frac{L_a}{L_u} - 1\right)x\right]^2 I1^2 \tag{8}$$

$$A = f_1(L_a, L_u, x) I1^2 \tag{9}$$

therefore:

$$I2 = I1 + I1\left(\frac{L_a}{L_u} - 1\right)x \tag{10}$$

$$I2 = f_2(L_a, L_u, x) I1 \tag{11}$$

and:

$$\text{Power} = (Vdc)(Idc) = \left(A\frac{J}{\text{cycle}}\right)\left(y\frac{\text{cycle}}{\text{rev}}\right)\left(n\frac{\text{rev}}{\text{min}}\right)\left(\frac{1\,\text{min}}{60\,\text{sec}}\right) \tag{12}$$

As may be seen from the above, one of the assumptions that simplified the development of the linearization of the switched reluctance generator output is that the magnitude of I2−I1 is some fraction of Im−I1 [x=(I2−I1)/(Im−I1) where $0 \leq x \leq 1$], where I1 is the maximum excitation current at the aligned position and Im is the current at the unaligned position with the excitation flux linkage. It has been shown that the ratio x, a design/control parameter selected by the engineer, can be varied. By varying x, the flux level necessary to produce a desired output power is also varied. Since the eddy current and hysteresis losses are a function of the flux level, x can be varied to adjust the efficiency. Varying x also has an effect on the current ripple on the DC link. Since it is necessary to use capacitors to filter the current ripple and provide smooth DC voltage, selection of x can affect the amount of capacitance necessary to produce the desired power quality. Additionally, with this commutation approach the machine is capable of producing significant DC current even at 20% of rated voltage.

Figure 9:
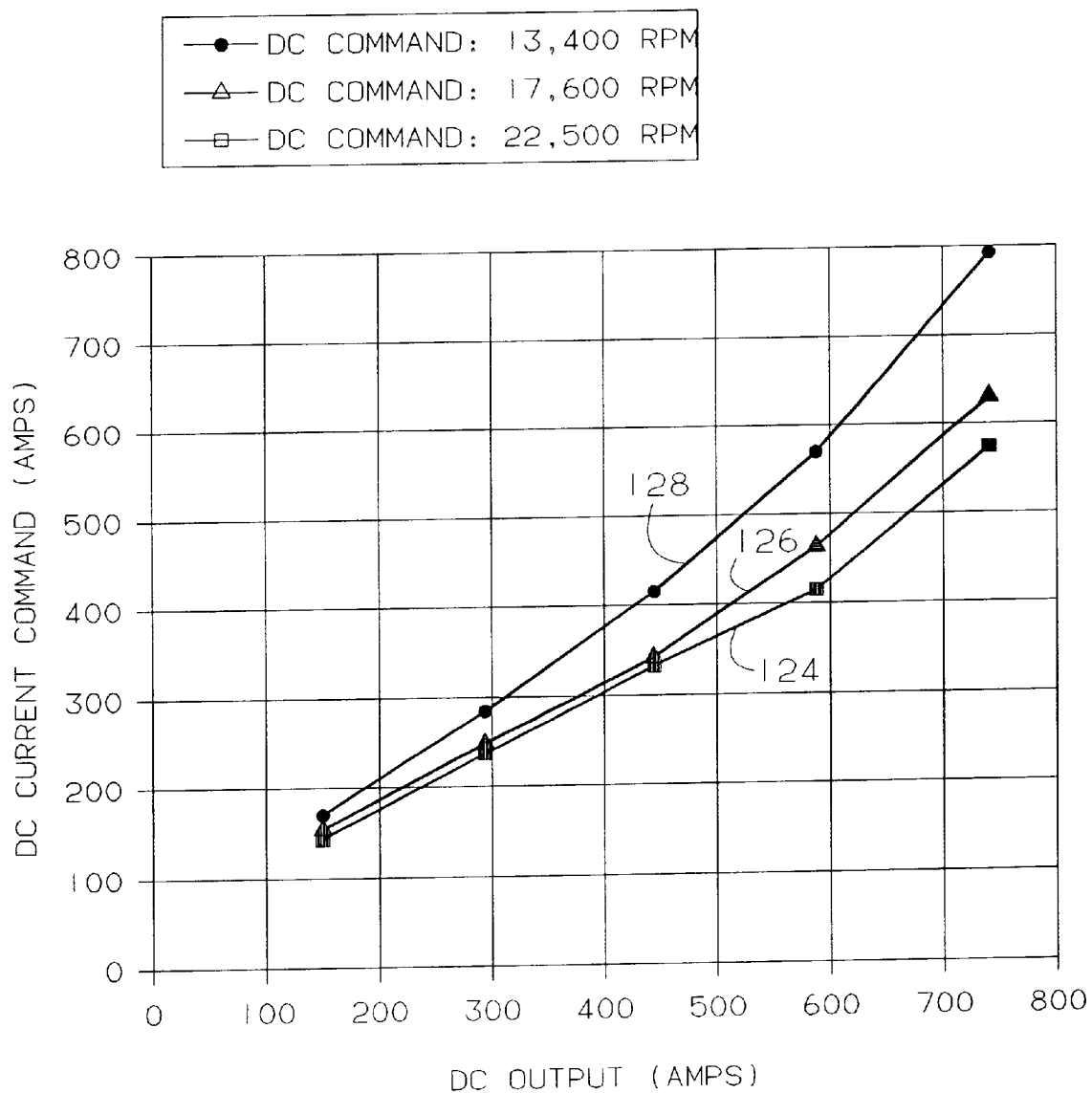
FIG. 9 is a graphical illustration of the relationship between the desired DC link current and the commanded DC link current showing linearization between the commanded DC link current and the actual DC current for a system implementing an embodiment of the commutation approach of the instant invention.
Figure 10:
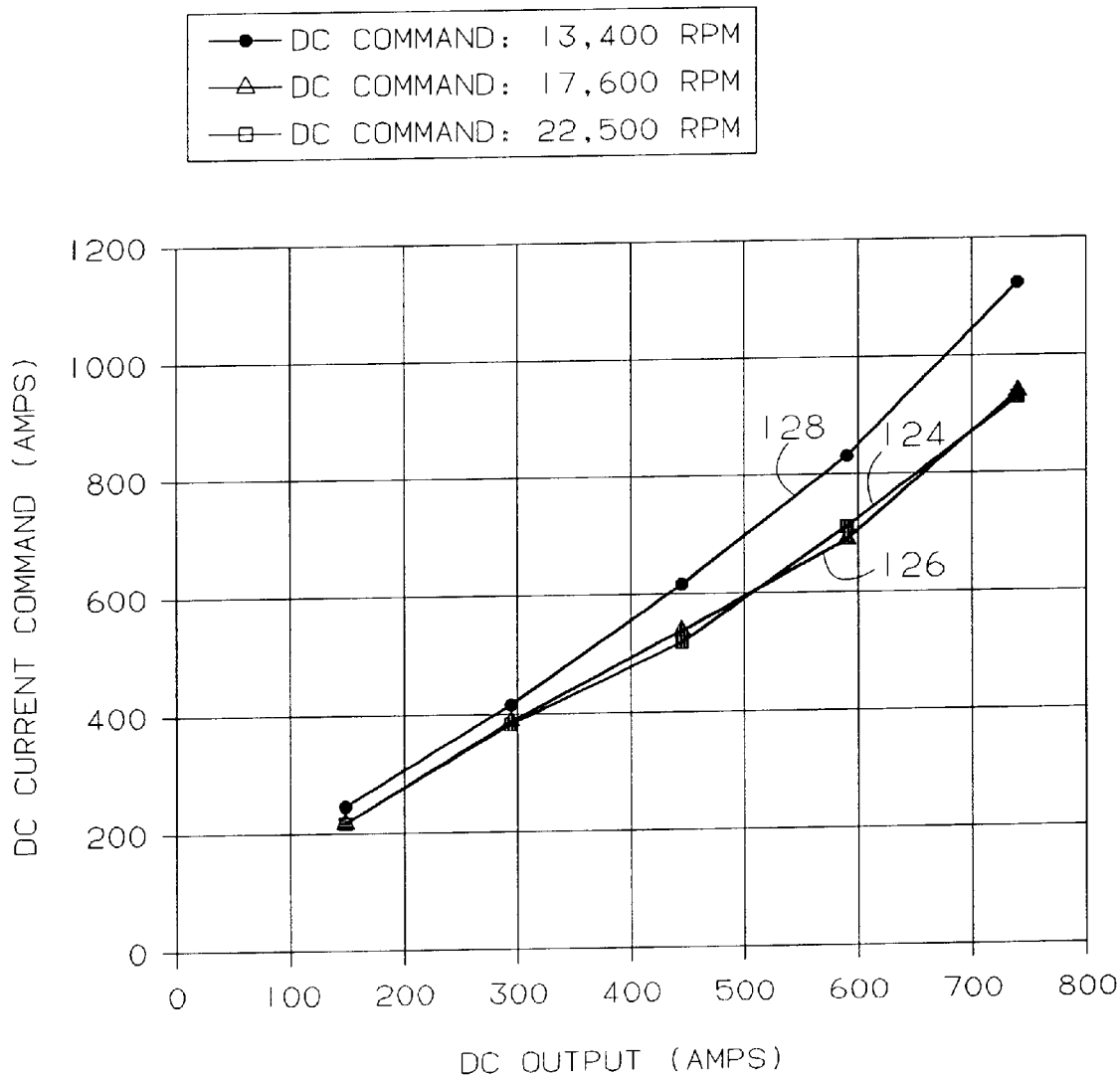
FIG. 10 is a graphical illustration of the relationship between the desired DC link current and the commanded DC link current calculated for a 0.03 inch air gap applied to a machine with a 0.04 inch air gap which shows linearization between the commanded DC link current and the actual DC current for a system implementing an embodiment of the commutation approach of the instant invention.

As may be seen from FIG. 9, the relationship between the desired DC link current and the commanded DC link current shows very good linearization over a wide speed range. Curve 124 is for a machine operating at 13,400 rpm, curve 126 is for a machine operating at 17,600 rpm, and curve 128 is for a machine operating at 22,500 rpm. The commutation approach of the instant invention also produces output linearization with wide variations in the machine characteristics themselves. FIG. 10 illustrates the relationship between the desired DC link current and the commanded DC link current over the same three operating speeds with the same controller, but with an air gap which has been increased from 0.03 inch (as used in FIG. 9) to 0.04 inch.

Figure 11:
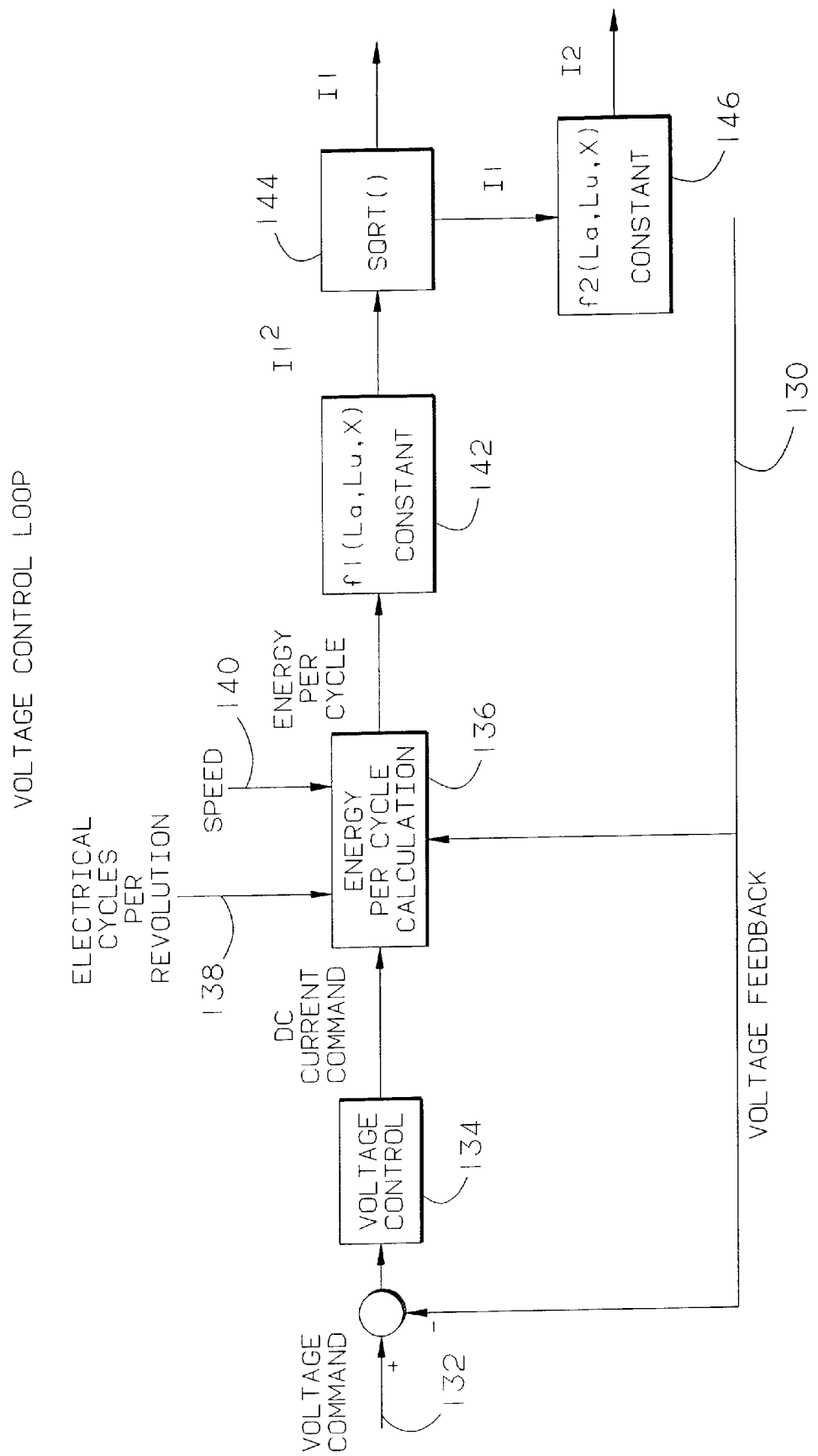
FIG. 11 illustrates in block diagrammatic form a voltage control loop implementation of an embodiment of the commutation method of the instant invention.

FIG. 11 illustrates an implementation of the linearizing approach of the instant invention as described above in a voltage control loop. In this embodiment, the DC link voltage is fed back to the controller via line 130. It is compared with the voltage command from the controller via line 132 and input to a voltage control block 134 where the DC current command is generated. This DC current command is input to a calculation of the energy per cycle utilizing the above equations and the inputs of the number of electrical cycles per revolution on line 138, the machine speed on line 140, and the DC link voltage on line 130. The energy per cycle, once calculated, is used by the constant function block 142 to output $I1^2$ which, through the square root function block 144, outputs the control variable $I1^2$ as calculated above. Through the known relationship of I1 and I2 shown above, the constant function block 146 outputs the other control variable I2 for use in the commutation control.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

I claim:

1. A method of linearizing the output performance of a switched reluctance generator, comprising the steps of:

exciting the switched reluctance generator at a turn-on angle;

freewheeling the switched reluctance generator at a second angle when a phase current of the switched reluctance generator exceeds a first calculated current level;

generating the switched reluctance generator at a third angle when said phase current of the switched reluctance generator exceeds a second calculated current level; and wherein said first and said second calculated current levels are calculated as a function of energy converted per electrical cycle.

2. The method of claim 1, further comprising the step of generating the switched reluctance generator at a turn-off angle.

3. The method of claim 1, wherein said function of energy converted per electrical cycle is calculated using a first inductance of the switched reluctance generator in an aligned position and a second inductance of the switched reluctance generator in an unaligned position.

4. The method of claim 3, wherein said turn-on angle is unrelated to said first and said second calculated current levels.

5. The method of claim 1, wherein during said exciting step said phase current of the switched reluctance generator increases along a flux linkage versus current curve having a slope approximately equal to an aligned inductance of the switched reluctance generator.

6. The method of claim 5, wherein during said freewheeling step said phase current of the switched reluctance generator increases while a flux linkage of the switched reluctance generator remains relatively constant.

7. The method of claim 6, wherein during said generating step said phase current of the switched reluctance generator remains relatively constant while said flux linkage droops.

8. The method of claim 7, wherein during said generating step said flux linkage droops until it reaches a given value determined by a flux linkage versus current curve determined by an unaligned inductance of the switched reluctance generator, at which point said phase current of the switched reluctance generator decreases along a flux linkage versus current curve having a slope approximately equal to an unaligned inductance of the switched reluctance generator.

9. A method of linearizing the performance of a switched reluctance generator, comprising the steps of:

exciting the switched reluctance generator with phase current which follows a flux linkage versus current curve having a slope approximately equal to an aligned inductance of the switched reluctance generator;

freewheeling the switched reluctance generator with increasing phase current while maintaining a flux linkage of the switched reluctance generator relatively constant; and generating the switched reluctance generator with relatively constant phase current while said flux linkage droops during a first phase of generation until said flux linkage droops to a predetermined value determined by a flux linkage versus current curve governed by an unaligned inductance of the switched reluctance generator, at which point said phase current of the switched reluctance generator decreases along a flux linkage versus current curve having a slope approximately equal to an unaligned inductance of the switched reluctance generator.

10. A method of linearizing the performance of a switched reluctance generator, comprising the steps of:

monitoring a bus voltage, a speed of the switched reluctance generator, and a number of electrical cycles per revolution of the switched reluctance generator; comparing said bus voltage with a predetermined voltage command to generate a voltage error signal;

calculating a dc current command signal from said voltage error signal;

calculating energy per cycle of the switched reluctance generator;

calculating a first calculated current level from said energy per cycle and a second calculated current level from said first calculated current level;

exciting the switched reluctance generator until a phase current exceeds said first calculated current level;

freewheeling the switched reluctance generator until said phase current exceeds said second calculated current level; and thereafter generating the switched reluctance generator.

* * * * *